Patented Oct. 30, 1923.

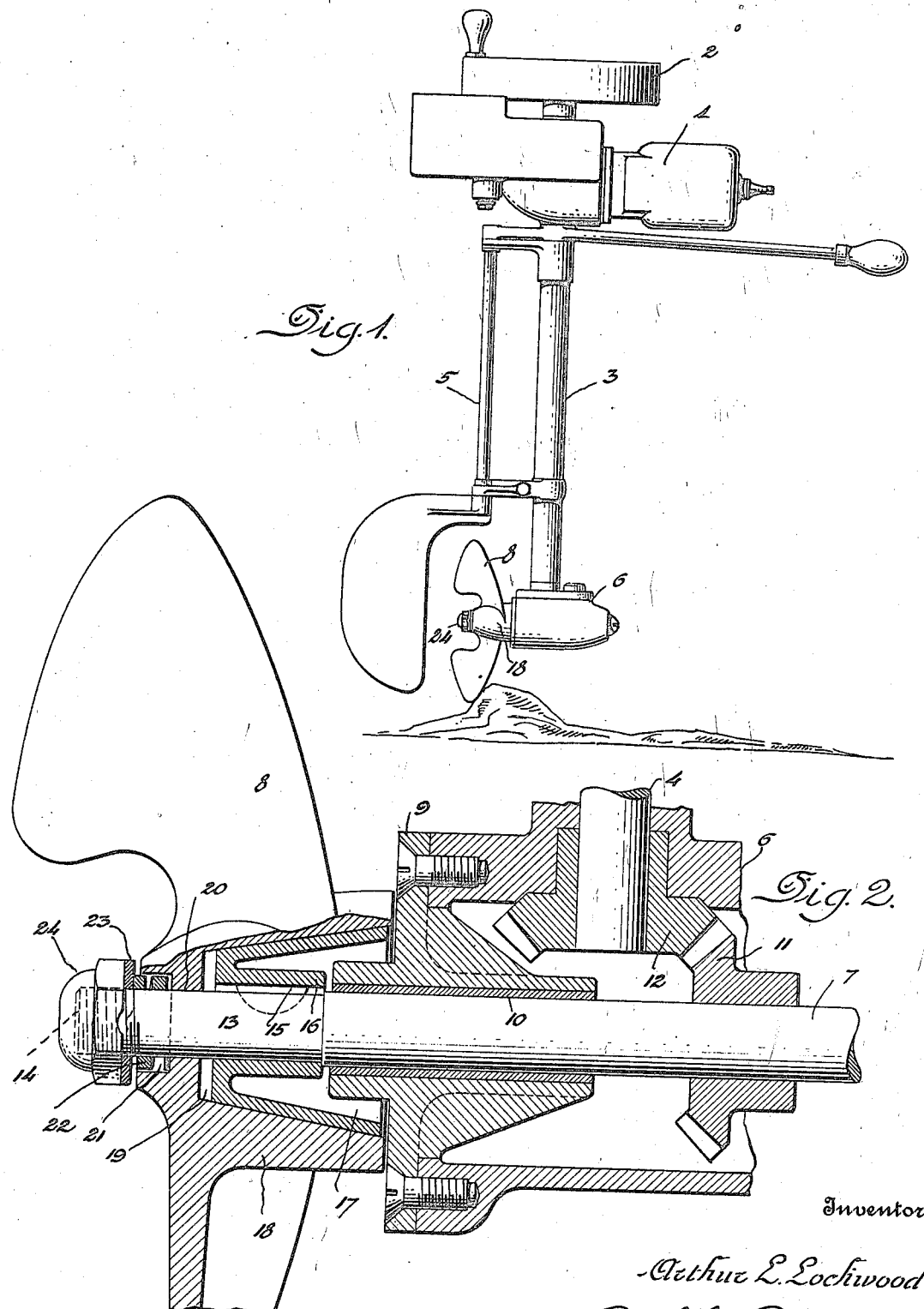

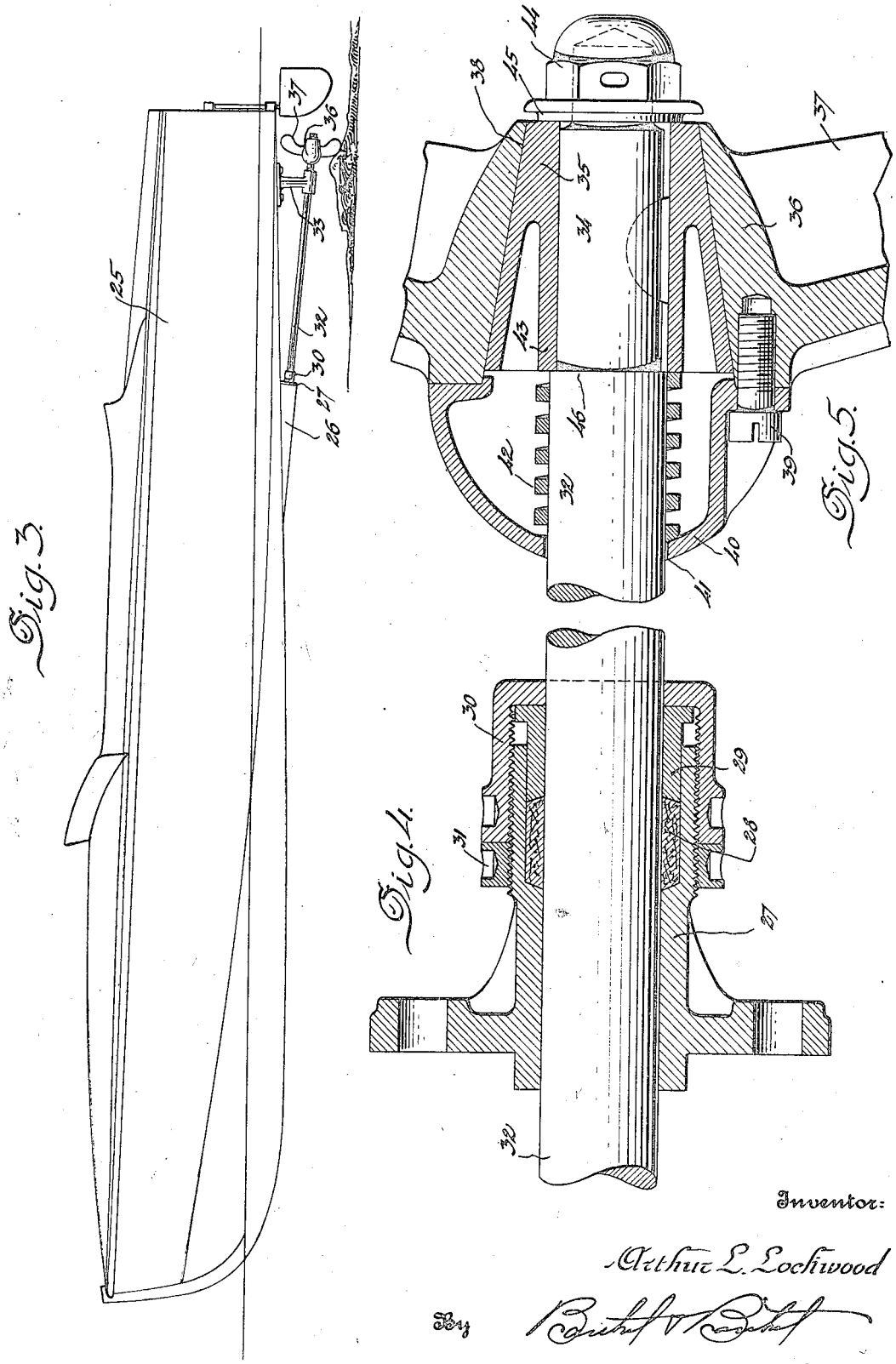

1,472,077

UNITED STATES PATENT OFFICE.

ARTHUR L. LOCKWOOD, OF JACKSON, MICHIGAN.

SAFETY CLUTCH FOR PROPELLERS.

Application filed July 10, 1922. Serial No. 574,035.

*To all whom it may concern:*

Be it known that I, ARTHUR L. LOCKWOOD, a citizen of the United States of America, residing at Jackson, in the county of Jackson and State of Michigan, have invented certain new and useful Improvements in Safety Clutches for Propellers, of which the following is a specification, reference being had therein to the accompanying drawings.

This invention relates to safety clutches for propellers, and has special reference to the propellers of outboard motors of power plants of various kinds of boats and especially any propeller that is unguarded against obstacles that may be encountered during the operation of the propeller.

One of the objects of my invention is to provide a clutch connected propeller wherein the forward thrust of the propeller is utilized as a means of insuring a driving relation at the clutch, between the power plant and propeller.

Another object of my invention is to furnish a propeller shaft with a friction clutch for holding a propeller so as to be driven by the propeller shaft, the clutch establishing a yieldable connection between the propeller and the shaft so that should a blade of the propeller encounter an obstruction or run aground it will not be broken because of the application of power, but will yield to the extent of disengagement relative to the propeller shaft and thus save the propeller from injury.

A further object of my invention is to provide a clutch held propeller that may be advantageously used in connection with the outboard motors of row boats since such boats are often operated in shallow streams and occasionally encounter an obstruction or run aground with the result that propeller blades are broken or a propeller shaft injured.

The clutch held propeller is applicable to any propeller shaft of such construction that it may be manufactured as cheaply as the usual propeller and as readily installed.

The above are a few of the objects attained by my invention and others will appear as the nature of the propeller construction is understood by aid of the accompanying drawings, wherein Figure 1 is a side elevation of an outboard motor provided with a propeller in accordance with this invention;

Fig. 2 is an enlarged longitudinal sectional view of a portion of the gear housing and propeller clutch relative to a propeller shaft;

Fig. 3 is a side elevation of a motor boat having a permanent power driven propeller shaft equipped with a clutch propeller in accordance with my invention;

Fig. 4 is a longitudinal sectional view of a stuffing box for a propeller shaft, and Fig. 5 is a longitudinal sectional view of a portion of the clutch propeller shown in Fig. 3.

Reference will first be had to Figs. 1 and 2 showing a conventional form of outboard motor including an internal combustion engine 1, a balance wheel and starting device 2, a drive shaft tube 3 for a guide shaft 4, a rotor and steering assembly 5, a gear housing 6, a driven propeller shaft 7, and a propeller 8.

The gear housing 6 has a detachable end wall 9 provided with a bearing 10 which cooperates with the gear housing 6 in supporting the propeller shaft 7 and said propeller shaft is provided with a beveled gear wheel 11 meshing with a similar gear wheel 12 on the drive shaft 4, so that the internal combustion engine 1 may drive the propeller shaft.

The outer end of the propeller shaft 7 is reduced, as at 13 and exteriorly screwthreaded as at 14. In the reduced end 13 of the propeller shaft is a Woodruff key 15 or other fastening means for holding the hub portion 16 of a frustro conical shaped friction clutch member 17 adapted for rotative continuity with the propeller shaft 7. The clutch member 17 tapers inwardly from its inner end to its outer end which supports the hub 16 within the clutch member so as to reduce the longitudinal dimensions of said member.

The propeller 8 has a conical shaped hub 18 provided with a frustro-conical shaped recess 19 with the walls of said recess fitting on the clutch member 17 to establish a driving relation between said clutch member and the propeller. Axially of the propeller hub 18 is an opening 20 for the reduced end 13 of the propeller shaft 7 and the outer end of the propeller hub has a small recess 21 for some of the convolutions of a coiled expansion spring 22 encircling the reduced end 13 of the propeller shaft 7 and engaging a wear plate or nut locking washer 23 retained on the reduced end of the propeller shaft by a cap nut 24 which is screwed on the threaded extremity of the propeller shaft. The expansive force of the spring 22 holds the propeller hub 18 in frictional engagement with the clutch member 17 which is keyed on the propeller shaft, and a driving relation is estblished between the propeller and its operating shaft until a blade of the propeller encounters an obstruction, for instance as shown in Fig. 1. Then, without the propeller or blade bending breaking or being fractured, said propeller yields by placing the spring 22 under compression and disengaging the clutch member 17, said propeller hub receding sufficiently to permit the clutch member 17 to be freely revolved by the propeller shaft 7, independent of the propeller 8. In consequence of the propeller yielding rearwardly and disconnecting the power relative thereto the chances of the propeller being injured by a floating or ground obstruction is reduced to a minimum. It is obvious that after such obstruction has been overcome that the expansive force of the spring 22 restores the driving relation between the propeller hub 18 and the clutch member 17, so that the end thrust of the propeller is again brought into action.

A regulation launch 25 has been shown in Fig. 3 as having its propeller log 26 provided with a stuffing box 27 containing packing 28 and a gland 29 held in place by a cap 30 and a lock nut 31. A propeller shaft 32 extends through the stuffing box 27 and through a hanger or bearing 33 provided therefor adjacent the transom or stern of the launch. The rear end of the propeller shaft 32 is reduced, as at 34 and provided with a keyed or otherwise fixed conical clutch member 35 similar to the clutch member 17. Frictionally mounted on the clutch member 35 on the hub portion 36 of a propeller 37, said hub portion having a conical recess 38 to receive the clutch member 37 and establish a driving relation between the propeller and its operating shaft. Suitably attached to the large end of the propeller hub 36, by screws 39 or other fastening means, is a semi-spherical hollow cap 40 having an opening 41 providing clearance for the propeller shaft 32. In the cap 40 and about the propeller shaft 32 is a coiled expansion spring 42 having one end convolution thereof abutting the hub 43 of the clutch member 35 and the other end convolution abutting the cap 40 adjacent the opening 41. The expansive force of the spring 42 is in a forward direction to frictionally bind the propeller hub 36 on the clutch member 35 and the clutch member 35 is retained on the reduced end of the propeller shaft by a cap nut 44 and a wear plate 45 mounted on the rear end of the propeller shaft. With the clutch member 35 abutting an angular shoulder 46 of the propeller shaft 32 it is practically impossible for said clutch member to become accidentally displaced, and should the propeller 37 impinge against a floating or fixed obstruction, for instance as shown in Fig. 3, the propeller hub 36 is disengaged from the power driven clutch member 35, consequently the propeller cannot be materially injured by the obstruction.

I attach considerable importance to the fact that the forward thrust of the propeller establishes a positive driving relation between the power plant and the propeller, the spring which maintains the yieldable connection simply establishing a driving relation for starting purposes, so that the power plant may pick up the propeller and cause forward movement. The thrust of the propeller, in addition to that of the spring, furnishes sufficient pressure at the clutch for a driving force, yet when the propeller strikes an obstacle and ceases to revolve there is immediate disengagement of the clutch members and the engine or power plant can continue to operate.

I also attach considerable importance to the fact that the slip clutch, in both instances, is embodied in the propeller hub and no material change is neccessary in the gear housing of an outboard motor or in the usual power plant equipment of any kind of water craft.

What I claim is:—

1. The combination of a propeller shaft, a clutch member fixed thereon, a propeller having a hub frictionally engaging said clutch member to establish a driving relation and means on said propeller shaft maintaining the driving relation between said propeller hub and said clutch member and adapted to permit instant disengagement of said propeller hub relative to said clutch member when said propeller encounters an obstacle, said means including a spring encircling said propeller shaft and housed in part by the hub of said propeller.

2. The combination of a gear housing, a detachable end wall for said housing, a driven propeller shaft, journalled in said end wall a propeller hub on said shaft, a yieldable connection outside of said gear housing at the forward end of said propeller hub between said hub and said shaft, and means at the rear end of said propeller hub maintaining said yieldable connection so that there is a driving relation normally between said propeller hub and shaft.

3. Means adapted to prevent inury to propeller blades driven by a propeller shaft and liable to encounter an obstruction, said means comprising cluth members between the propeller and propeller shaft utilizing the end thrust of the propeller to maintain a driving relation between the propeller and the propeller shaft, said clutch members being capable of separation when the propeller encounters an obstacle, and means inclosed by a portion of said propeller to establish a driving relation after said clutch members have been separated and the obstacle overcome.

In testimony wherof I affix my signature in presence of two witnesses.

ARTHUR L. LOCKWOOD.

Witnesses:
F. F. LOCKWOOD,
W. LAMENT ASH.